United States Patent
Dhanapal et al.

(10) Patent No.: US 8,402,312 B2
(45) Date of Patent: Mar. 19, 2013

(54) METHOD AND SYSTEM FOR TESTING AN APPLICATION

(75) Inventors: Karthikeyan Balaji Dhanapal, Karnataka (IN); Sanjoy Paul, Karnataka (JP)

(73) Assignee: Infosys Technologies Limited (IN)

(*) Notice: Subject to any disclaimer, the term of this patent is extended or adjusted under 35 U.S.C. 154(b) by 188 days.

(21) Appl. No.: 12/813,733

(22) Filed: Jun. 11, 2010

(65) Prior Publication Data
US 2011/0145642 A1   Jun. 16, 2011

(30) Foreign Application Priority Data
Dec. 16, 2009  (IN) .......................... 3109/CHE/2009

(51) Int. Cl.
*G06F 11/00*   (2006.01)

(52) U.S. Cl. .......... 714/28; 370/241; 370/242; 370/245; 370/252; 455/424; 714/4.1; 714/27; 714/32

(58) Field of Classification Search ................ 370/241, 370/242, 245, 252; 455/424; 714/4.1, 27, 714/28, 32
See application file for complete search history.

(56) References Cited

U.S. PATENT DOCUMENTS

| | | | |
|---|---|---|---|
| 7,339,899 B2 * | 3/2008 | Liu et al. ........................ 370/252 |
| 7,349,670 B2 * | 3/2008 | Mlinarsky et al. ......... 455/67.11 |
| 7,376,550 B1 * | 5/2008 | Bokaemper et al. ............ 703/27 |
| 7,447,622 B2 * | 11/2008 | Arama et al. .................... 703/23 |
| 7,620,535 B2 * | 11/2009 | Shevenell et al. ............... 703/13 |
| 7,623,463 B2 * | 11/2009 | Chavda ......................... 370/241 |
| 7,672,669 B2 * | 3/2010 | Alexander et al. ............ 455/423 |
| 7,751,813 B2 * | 7/2010 | Varanda ........................ 455/423 |
| 7,765,096 B1 * | 7/2010 | Bokaemper et al. ............ 703/27 |
| 7,983,155 B2 * | 7/2011 | Zaniolo et al. ................ 370/229 |
| 8,094,686 B2 * | 1/2012 | Bedrosian ..................... 370/503 |
| 2003/0156549 A1 * | 8/2003 | Binder et al. ................. 370/252 |
| 2006/0072466 A1 * | 4/2006 | Wang et al. ................... 370/241 |
| 2007/0147246 A1 * | 6/2007 | Hurley et al. ................. 370/232 |
| 2009/0316587 A1 * | 12/2009 | Omar ........................... 370/245 |
| 2011/0122776 A1 * | 5/2011 | Jacob et al. ................... 370/250 |

* cited by examiner

*Primary Examiner* — Joshua P Lottich
(74) *Attorney, Agent, or Firm* — Cantor Colburn LLP

(57) ABSTRACT

The present invention provides a method, test-bed and computer program product for testing an application installed on a wireless communication device. The wireless communication device communicates one or more messages wirelessly to a server through a test-bed. The test-bed is connected with the server and provides one or more testing parameters for the one or more messages. A tester, testing the application, assigns a probability to the one or more messages. Further, the tester assigns a probability to the one or more testing parameters. Thereafter, the messages are re-communicated between the server and wireless communication device through the test-bed. Subsequently, the one or more messages are identified by the test-bed and one or more wireless network conditions are emulated based on the probabilities assigned to the one or more messages and the one or more testing parameters.

26 Claims, 4 Drawing Sheets

METHOD AND SYSTEM FOR TESTING AN APPLICATION

BACKGROUND

The present invention relates to testing an application installed on a wireless communication device. More specifically, it relates to testing a wireless communication device application based on messages.

With the exponential growth of wireless technology, various applications are being developed for wireless communication devices. Examples of such wireless communication devices include personal digital assistants (PDAs), mobile phones, laptops, computers, navigational devices, etc. There are various applications that run on the wireless communication devices, such as Internet browsers, applications that enable chatting, media players that stream live music through the Internet, etc. These applications are tested before they are launched in the market, to be used with the wireless communication device(s).

Presently, the testing is performed by a tester with an expertise in the domain of testing. The tester tests the application using emulators by providing multiple testing parameters such as bandwidth, signal strength, packet delay, packet dropping, signal amplitude, and so forth. The combinations of such testing parameters for which the application can be tested are infinite and thus incur a considerable amount of time. Due to time limitations, the tester may not be able to test the application for a finite set of testing parameters and therefore fails to test the application rigorously for various testing parameters.

In light of the foregoing discussion there is a need for a method and system that reduce the complexity in testing the application. The method and system should enable the tester to select a set of testing parameters and simultaneously should also allow the tester to select a set of messages for testing the application.

SUMMARY

An object of the invention is to test an application installed on a wireless communication device communicating with a server over a wireless network.

Another object of the invention is to test an application installed on a wireless communication device for at least one message that is communicated to a server through a test-bed.

Yet another object of the invention is to test an application installed on a wireless communication device for selected wireless network conditions.

To achieve the objectives above, the invention provides a method, a test-bed and a computer program product to test an application installed on a wireless communication device. The wireless communication device communicates one or more messages wirelessly to a server through a test-bed. The test-bed is connected with the server and provides one or more testing parameters for the one or more messages. A tester testing the application assigns probabilities to the one or more messages. Further, the tester assigns probabilities to the one or more testing parameters. Thereafter, the messages are re-communicated between the server and the wireless communication device through the test-bed. Subsequently, the one or more messages are identified by the test-bed among the re-communicated messages, and on identification of the messages, one or more wireless network conditions are emulated based on the probabilities assigned to the one or more messages and the one or more testing parameters. The tester then performs the testing of the application in the emulated wireless network conditions. Further, to achieve the objectives above, the invention provides a test-bed to test an application installed on a wireless communication device. The test-bed establishes a wireless network with the wireless communication device. The test-bed provides a set of testing parameters for one or more messages. Further, the test-bed includes a memory module to store the one or more messages that are communicated between an application installed on the wireless communication device and a server. The memory module communicates the messages to a user-interface in the test-bed. The user-interface enables a tester to assign probabilities to the one or more messages that were communicated between the server and the application. Further, the user-interface enables the tester to assign probabilities to the one or more testing parameters. Thereafter, the application installed on the wireless communication device re-communicates the messages to the server. A control module in the test-bed monitors the messages. The control module identifies the one or more messages that are re-communicated and emulates one or more wireless network conditions based on the probabilities assigned to the one or more messages and the one or more testing parameters. The tester then tests the application in the emulated wireless network conditions.

The method and test-bed mentioned above have a number of advantages. By assigning probabilities, the tester can select a set of messages for which an application can be tested. Further, the method enables the tester to assign probabilities to the testing parameters. For example, if a tester wants to test the application for the emulated wireless network conditions such as loss of connectivity, then the tester would want to test the application either when a message is sent to the server or received from the server. Thereby, the tester can assign a higher probability to such a message among the one or more messages that are communicated between the application installed on the wireless communication device and the server. Thereby, the loss of connectivity can be emulated in order to check the behavior of the application at the selected message. Further, the method allows the tester to group the messages into multiple groups and through probabilities assigned to the messages and the testing parameters, enables the tester to select a finite set of messages and a finite set of testing parameters for which the application can be tested.

BRIEF DESCRIPTION OF THE DRAWINGS

The various embodiments of the invention will hereinafter be described in conjunction with the appended drawings, provided to illustrate and not to limit the invention, wherein like designations denote like elements, and in which.

DESCRIPTION OF VARIOUS EMBODIMENTS

The invention describes a method, test-bed and computer program product for testing an application installed on a wireless communication device. The wireless communication device communicates one or more messages to a server through a test-bed. A tester assigns probability to the one or more messages communicated to the server. The tester also assigns probabilities to one or more testing parameters provided by the test-bed. Once the tester assigns probabilities to the one or more messages and the one or more testing parameters, various messages are re-communicated to the server through the test-bed. Thereafter, the test-bed identifies the one or more messages among the re-communicated various messages and emulates one or more wireless network conditions based on the probabilities assigned to the one or more messages and the one or more testing parameters. The tester tests the application in the emulated wireless network conditions.

Figure 1:
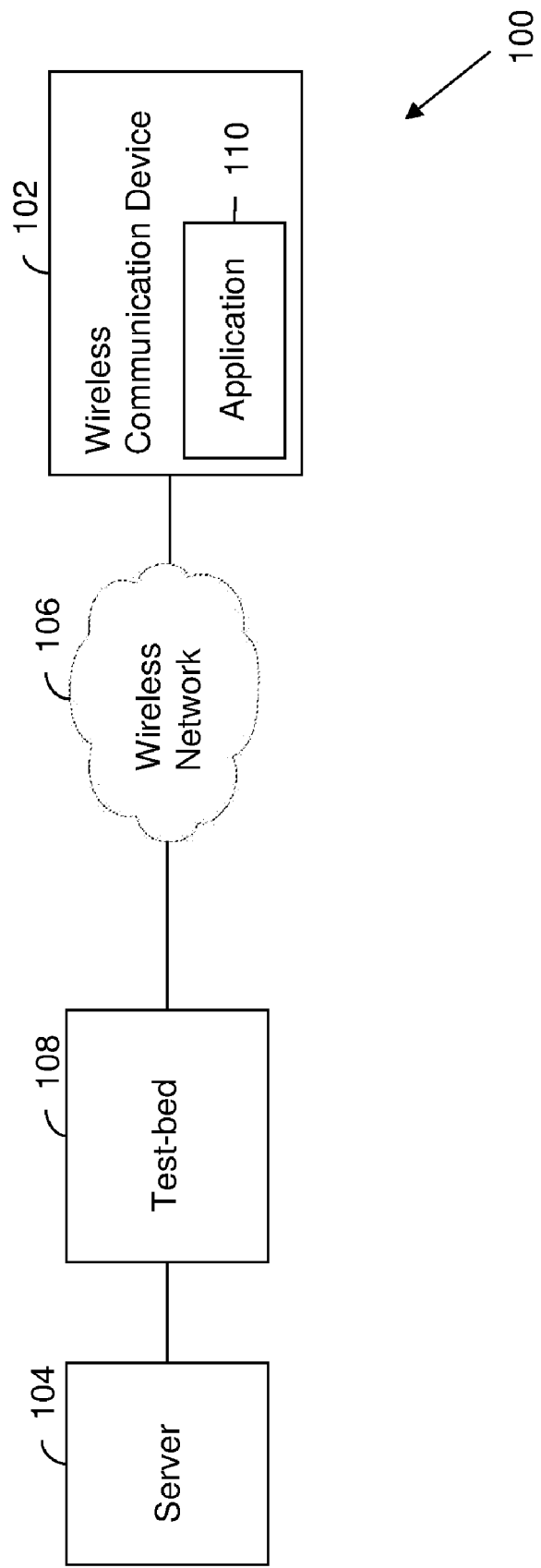
FIG. 1 illustrates an environment 100 in which various embodiments of the invention may be practiced.

FIG. 1 illustrates an environment 100 in which various embodiments of the invention may be practiced. Environment 100 includes a wireless communication device 102, a server 104, a wireless network 106 and a test-bed 108. Wireless communication device 102 includes an application 110.

Wireless communication device 102 communicates with server 104 over wireless network 106. Wireless communication device 102 communicates with server 104 through test-bed 108. Thereafter, application 110 installed on wireless communication device 102 interacts with server 104 through test-bed 108.

It will be apparent to one skilled in the art that test-bed 108 acts as an access point for wireless communication device 102. In an embodiment of the invention, test-bed 108 and server 104 are connected by a wired connection.

Test-bed 108 establishes wireless network 106 with wireless communication device 102. Thereafter, wireless communication device 102 communicates with server 104 through test-bed 108 over wireless network 106. Subsequently, application 110 installed on wireless communication device 102 communicates with server 104 through one or more messages. These messages are monitored by test-bed 108. Further, these messages correspond to the actions that a tester performs through application 110. Various examples of the actions that the tester performs through application 110 include, but are not limited to, 'connect with server 104', 'login details', 'transact', and so forth. Each action has corresponding one or more messages, such as 'connect with server message', 'login details message', 'transact message' and so forth, that are communicated to server 104. Server 104 communicates messages corresponding to the actions executed by server 104 to wireless communication device 102, such as, 'acknowledgment to connection message, 'authentication message'. Similarly, various messages are communicated between server 104 and application 110 installed on wireless communication 102 device through test-bed 108 over wireless network 106.

It may be apparent to one skilled in the art that the various messages are packets communicated by wireless communication device 102 to server 104. Further, these messages/packets are communicated based on the Internet Protocol (IP) address of wireless communication device 102, IP address of server 104, and so forth.

Thereafter, test-bed 108 enables the tester to assign probabilities to at least one message of the various messages communicated between wireless communication device 102 and server 104. Test-bed 108 provides one or more testing parameters associated with wireless network 106 for the one or more messages. Further, test-bed 108 enables the tester to assign probabilities to the one or more testing parameters. These testing parameters are explained in detail in conjunction with FIG. 2. Subsequently, the various messages are re-communicated through test-bed 108 for which the tester performs same actions again through application 110. Test-bed 108 monitors the messages that are re-communicated between wireless communication device 102 and server 104. Further, test-bed 108 identifies the one or more messages selected by the tester among the re-communicated messages. Upon the identification of the one or more messages, test-bed 108 selects the one or more messages and emulates one or more wireless network conditions based on the probabilities assigned to the one or more messages and the one or more testing parameters. Behavior and performance of application 110 is then tested in the emulated wireless network conditions by the tester.

In accordance with an embodiment of the present invention, the tester groups the one or more messages into multiple groups. Thus, for example, for ten messages $X_1, X_2 \ldots X_{10}$ that the tester wants to test, the tester may group the messages in the following manner: $G_1=\{X_1, X_2\], G_2=\{X_3, X_4, X_5\}$, and so forth, where $G_1$ and $G_2$ are two separate groups. It should be noted that a message may be included in multiple groups. In accordance with an embodiment of the present invention, test-bed 108 emulates the wireless network conditions for each of these groups independently. Further, the tester assigns probabilities to one or more testing parameters provided by test-bed 108 to be applied to these groups.

The details provided below explain an exemplary test case where the tester tests application 110, such as an Internet browser. The Internet browser communicates with server 104, such as a bank server. The tester, using test-bed 108, initially monitors all the messages that application 110 communicates to server 104. Various examples of the messages include 'connect with server message', 'login details message', 'transact message', 'acknowledgment to connection message, 'authentication message', and so forth.

Thereafter, the tester assigns a probability to a message, such as the 'transact message', for example, a probability of 0.9. The tester also assigns a probability, for example a probability of one, to one or more testing parameters provided by test-bed 108, such as 'weak signal strength'. After the tester assigns probabilities to the message and the testing parameter, wireless communication device 102 re-communicates the messages through test-bed 108. Test-bed 108 monitors the re-communicated messages for the occurrence of the 'transact message' and identifies the 'transact message'. Based on the probability assigned to the 'transact message', test-bed 108 selects the 'transact message' and emulates 'weak signal strength'. The tester then observes the performance and behavior of application 110 in the emulated wireless network conditions associated with the 'weak signal strength'. The tester might observe that at 'transact message' when the weak signal strength is emulated by test-bed 108, application 110 might hang or might try to reconnect with server 104. Observing such behavior of application 110 facilitates the testing of application 110.

Similarly, application 110 can be tested for various messages and the associated testing parameters. In an embodiment of the invention, application 110 can be tested for more than one message simultaneously.

Various examples of wireless communication device 102 include, but are not limited to, a mobile device, a personal digital assistant (PDA), a laptop, a computer, a navigational device, and the like. Similarly, various examples of wireless network 106 include, but are not limited to, a Bluetooth network, a General Packet Radio Service (GPRS), a Wireless Local Area Network (WLAN), 2.5G, 3G, and the like.

Various examples of application 110 include, but are not limited to, an Internet browser, a media-streaming player, an FM radio, a chatting application, and the like. In an embodiment of the invention, application 110 is a TCP/IP-based application. In another embodiment of the invention, application 110 can be a WAP-based application. In yet another embodiment of the invention, application 110 can be an OSI model-based application.

Figure 2:
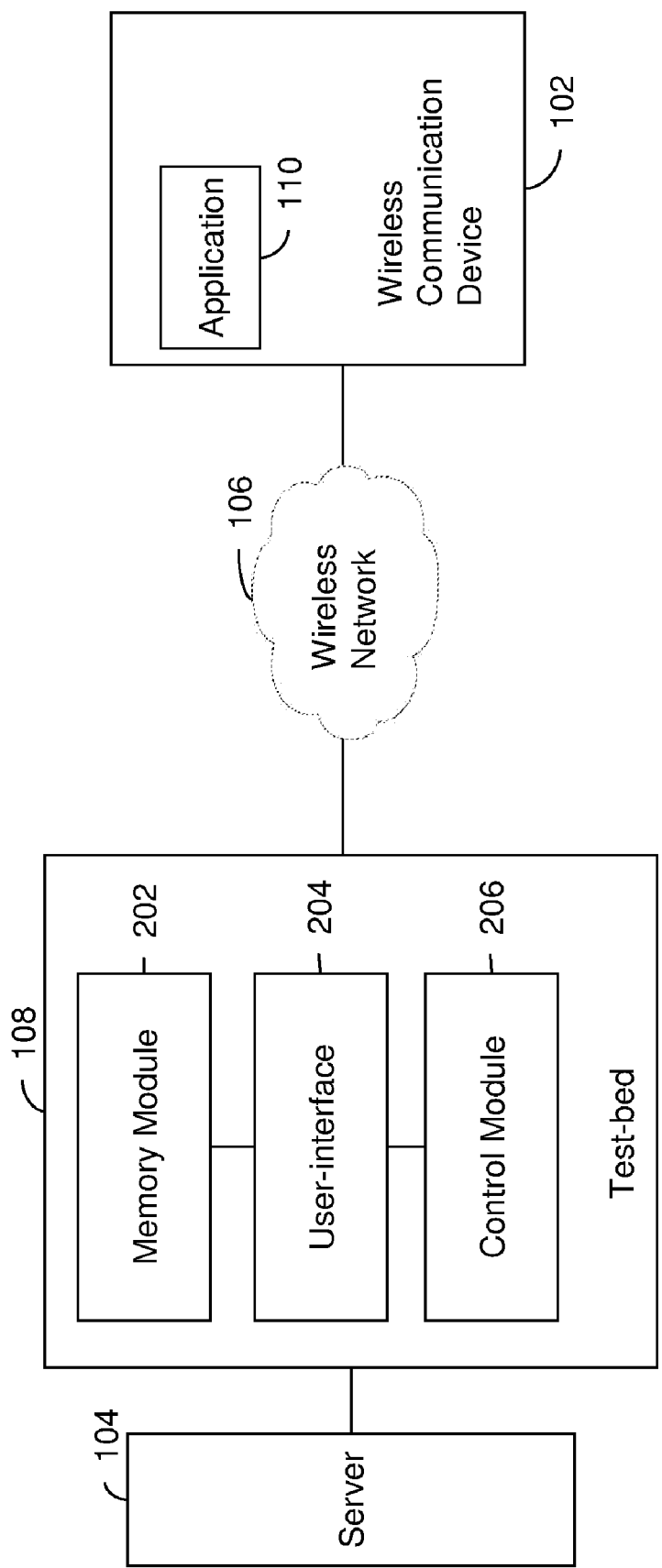
FIG. 2 is a block diagram of a test-bed 108 for testing an application 110 installed on a wireless communication device 102, in accordance with an embodiment of the invention.

FIG. 2 is a block diagram of test-bed 108 for testing application 110 installed on wireless communication device 102, in accordance with an embodiment of the invention. Test-bed 108 includes a memory module 202, a user-interface 204 and a control module 206. Wireless communication device 102 includes application 110.

Test-bed 108 establishes wireless network 106 with wireless communication device 102. In an embodiment of the invention, wireless network 106 can be selected through user-interface 204. Application 110 installed on wireless communication device 102 communicates one or more messages with server 104 through test-bed 108 over wireless network 106. These messages have been explained in detail in conjunction with FIG. 1.

Control module 206 monitors the messages communicated between application 110 installed on wireless communication device 102 and server 104. These messages are stored in memory module 202. Further, memory module 202 communicates these messages to user-interface 204. The tester then assigns probability to at least one message of the various messages stored in memory module 202 through user-interface 204. Further, the test-bed 108 provides one or more testing parameters associated with wireless network 106 for the various messages through user-interface 204 and the tester assigns probabilities to the one or more testing parameters. Further, the tester also groups the one or more messages into multiple groups through user-interface 204. The testing parameters and the various messages are communicated to control module 206.

In accordance with an embodiment of the present invention, the tester assigns a probability to each of the various messages. These probabilities correspond to the likelihood of those messages being selected for testing by test-bed 108. That is, higher the probability assigned to a particular message, higher the chances of that message being selected for testing. For example, if a message is assigned a probability of 0.8, it means that if the message is transmitted ten times during re-communication, it will be selected for testing eight times. The testing parameter that will be selected to test the message depends on the probabilities assigned to the testing parameters. Similar to the probabilities being assigned to the various messages, the probabilities assigned to the testing parameters determine the likelihood of those testing parameters being selected to test the various messages. Thus, for example, if a testing parameter is assigned a probability of 0.7, it means that for ten messages that are re-communicated, the testing parameter will be applied to seven of those messages. It should be noted that more than one testing parameter may be applied to a message simultaneously.

In accordance with an embodiment of the present invention, the tester assigns conditional probability to at least one testing parameter. For example, the tester may assign a conditional probability to a testing parameter $C_2$ in the following manner: $P(C_2|X_1, C_1)=1$. This may be interpreted as follows: When condition $C_1$ is applied on message $X_1$, condition $C_2$ will be applied to $X_1$ with the probability $P(C_2|X_1, C_1)$, that is, 1. Thus, conditional probability may be used to apply a sequence of network conditions on a selected message. In this case, once a combination of $X_1$ and $C_1$ has been formed and tested on the basis of their probabilities in an iteration, $C_2$ will henceforth always be selected in a deterministic manner in the same iteration. As used herein, an iteration includes the various messages re-communicated between wireless communication device 102 and server 104. It should be noted that during testing of application 110, multiple iterations may be performed by the tester. Similarly, the tester may also assign conditional probability to at least one message in the following manner: $P(X_1|X_2, C_1)=0.4$. In accordance with an embodiment, the probabilities assigned to the remaining messages and the remaining testing parameters may be unconditional or conditional probabilities, such as $P(X_3)=0.2$, $P(C_3|X3)=0.6$, and so forth.

Consider the following example: A tester assigns probabilities to ten messages $X_1, X_2, \ldots, X_{10}$. For example, let the assigned probabilities be $P(X_1)=0.9$, $P(X_2)=0.5$, $P(X_3)=0.3$, and so forth. Similarly, the tester also assigns probabilities to five testing parameters $C_1, C_2, \ldots, C_5$. The probabilities may be assigned as $P(C_1)=0.4$, $P(C_2)=0.7$, and so forth. Further, the tester also groups the messages into multiple groups $G_1$, $G_2$, and $G_3$ where $G_1=\{X_1, X_2, X_3, X_{10}\}$, $G2=\{X_3, X_4, X_5, X_9\}$, and $G_3=\{X_2, X_6, X_7, X_8\}$. The tester then assigns appropriate probabilities to the testing parameters.

In accordance with an embodiment, the tester may not specifically assign a probability to each and every message. In this case, the messages for which a probability has not been assigned by the tester may be considered to have a probability of zero. Thus, such a message will not be selected for testing. Similarly, a testing parameter for which the tester has not assigned a probability may be considered to have a probability of zero and will not be used to test any message. In accordance with another embodiment, any predefined probability within the range zero to one may be automatically assigned to messages and testing parameters to which the tester has not assigned any probability.

As discussed earlier, once the tester assigns probabilities to the messages and the testing parameters, the messages are re-communicated between wireless communication device 102 and server 104. Now, when control module 206 identifies message $X_1$, it checks the probability assigned to the message $X_1$ by the tester, in this case, 0.9. Based on this probability, control module 206 selects message $X_1$ for testing and then checks the probabilities assigned to each of the testing parameters $C_1$ through $C_5$. Based on the probabilities assigned to testing parameters $C_1$ through $C_5$, control module 206 selects at least one testing parameter, such as testing parameter $C_2$, for testing the message $X_1$, thereby forming the following combination: $\{X_1, C_2\}$. This means that testing parameter $C_2$ will be applied to the message $X_1$.

In accordance with an embodiment, control module 406 keeps track of all combinations containing at least one message and at least one testing parameter. If a combination has already been tested, control module 206 ensures that the combination is not tested again in the same iteration. Thus, in the above example, once the combination $\{X_1, C_2\}$ is tested, the same combination is not tested again in the same iteration. However, it should be noted that a combination such as $\{X_1, C_1, C_2\}$ may be tested. That is, in this case, the message $X_1$ may be tested with both the testing parameters $C_1$ and $C_2$ simultaneously.

In accordance with various embodiments, control module 206 identifies a message, such as message $X_1$, based on any of the following parameters: size of the message, content of the message, sequence number of the message, and so forth. It may be understood that the parameter for identification of the message is configured by the tester, preferably through user-interface 204. Further, in accordance with an embodiment, the tester also specifies a terminating condition, such as duration for which the messages have to be re-communicated between the wireless communication device 102 and server 104. For example, the tester may specify that the messages have to be re-communicated for only ten minutes. Thus, if a single iteration of re-communicating the messages between the server and the wireless communication device takes two minutes, five such iterations will be performed. It should be noted that any other similar terminating condition may also be specified by the tester. In accordance with another embodiment, the tester may also specify how many times a particular message from among the various messages is to be re-communicated between wireless communication device 102 and server 104.

Thereafter, the messages are re-communicated between wireless communication device 102 and server 104. Re-communication of the messages is explained in detail in conjunction with FIG. 3. Control module 206 monitors the messages that are re-communicated between server 104 and wireless communication device 102. Control module 206 identifies the messages, selected through user-interface 204, among the messages that are re-communicated. Subsequently, on the identification of the messages, control module 206 selects a message for testing and emulates one or more wireless network conditions as specified by the tester through user-interface 204 based on the probabilities assigned to the messages and the testing parameters. Finally, the tester tests application 110 in the emulated wireless network conditions.

In an exemplary test-case, the tester tests application 110 in a wireless network. Application 110 and server 104 communicate various messages through test-bed 108 for the execution of an action performed by the tester. These messages are stored in memory module 202 and displayed to the tester through user-interface 204. The tester assigns probabilities to these messages, such as 'transact message' through user-interface 204. Further, test-bed 108 provides various testing parameters such as, 'low bandwidth', 'weak signal strength', to which the user assigns probabilities. Thereafter, user-interface 204 communicates the 'transact message' and the testing parameters to control module 206. Subsequently, the messages are re-communicated through test-bed 108. Control module 206 monitors the re-communicated messages and identifies the 'transact message' among the various messages that are re-communicated. Control module 206 checks the probability assigned to the 'transact message' and based on the probability, selects it for testing. Control module 206 then selects at least one testing parameter based on the probabilities assigned to the testing parameters and emulates the wireless network conditions based on the selected at least one testing parameter. The tester observes the behavior of application 110 on the identification of 'transact message', for example, application 110 may hang, or may try to reconnect with server 104, or might request for a new IP address, and so forth. Such observations help the tester to test application 110 in the emulated wireless network conditions.

Similarly, application 110 can be tested for various other messages that are communicated between server 104 and application 110 installed on wireless communication device 102. Further, application 110 can be tested for various testing parameters such as packet delay, packet loss, packet drop, and so forth simultaneously. In various embodiments of the invention, test-bed 108 includes a processor (not shown in the figure), which performs various computations to emulate various wireless network conditions.

Various examples of the testing parameters include, but are not limited to, bandwidth, packet delay, packet loss, packet reordering, packet rescheduling, signal strength, signal amplitude, and the like. In an embodiment of the invention, user-interface 404 may be a graphical user interface (GUI).

Figure 3:
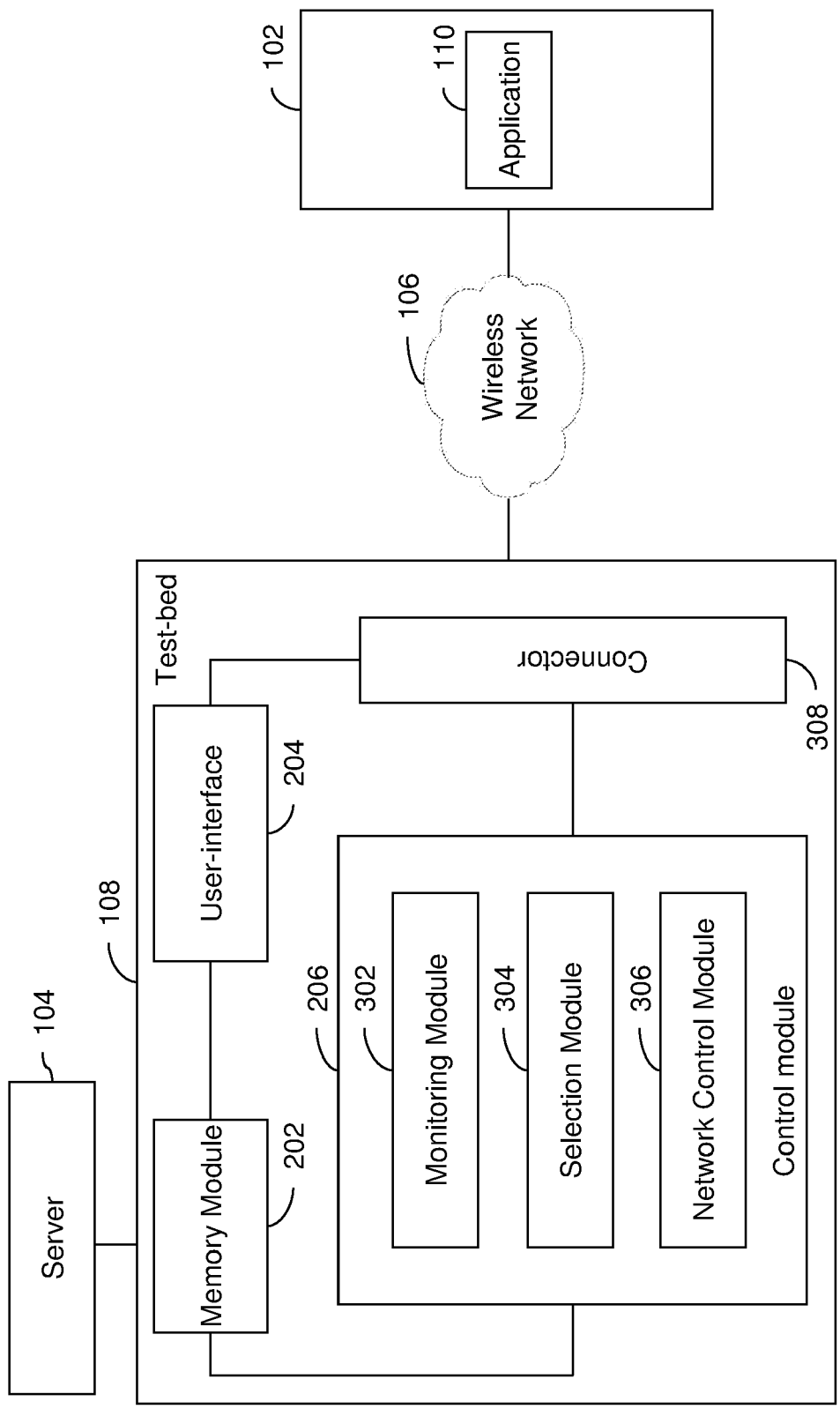
FIG. 3 is a block diagram of test-bed 108 for testing application 110 installed on wireless communication device 102, in accordance with another embodiment of the invention.

FIG. 3 is a block diagram of test-bed 108 for testing application 110 installed on wireless communication device 102, in accordance with another embodiment of the invention. Test-bed 108 includes memory module 202, user-interface 204, control module 206 and a connector 308. Control module 206 includes a monitoring module 302, a selection module 304, and a network control module 306. Further, wireless communication device 102 includes application 110.

As explained in conjunction with FIG. 2, wireless communication device 102 communicates various messages with server 104 over wireless network 106 through test-bed 108. In an embodiment of the invention, wireless network 106 is established by connector 308. Various examples of connector 308 include, but not limited to, a WLAN interface, and the like. In another embodiment of the invention, there can be more than one connector in test-bed 108.

Monitoring module 302 monitors the messages that are communicated between application 110 installed on wireless communication device 102 and server 104. Further, these messages are stored in memory module 202. Memory module 202 then communicates the messages to user-interface 204. A tester can then assign probabilities to messages through user-interface 204. Further, the tester assigns probabilities to various testing parameters provided by test-bed 108 through user-interface 204. The testing parameters are communicated to monitoring module 302. Thereafter, the messages are re-communicated between wireless communication device 102 and server 104. Monitoring module 302 monitors the messages that are re-communicated between server 104 and wireless communication device 102. Monitoring module 302 identifies the messages to which the tester had assigned probabilities earlier through user-interface 204. Monitoring module 302 then communicates the identification of the selected message to selection module 304. Subsequently, selection module 304 communicates one or more testing parameters to network control module 306, which in turn, emulates various wireless network conditions on the basis of the communicated testing parameters.

In various embodiments of the invention, the testing parameters include, but are not limited to, bandwidth, packet delay, packet loss, packet reordering, packet rescheduling, signal strength, signal amplitude, and the like.

In addition to receiving the testing parameters, user-interface 204 receives values that correspond to each of the testing parameters from the tester. An example of the corresponding values of the testing parameters may include, but may not be limited to, 40 kbps for bandwidth, 2 milliseconds for delay of packets, and the like. Other examples of the values may include, but not limited to, weak signal strength, strong signal strength, and the like.

User-interface 204 communicates the probabilities assigned to the messages and the testing parameters to monitoring module 302. Further, user-interface 204 also communicates the values associated with each of the testing parameters to monitoring module 302. Thereafter, the messages are re-communicated between server 104 and wireless communication device 102 through test-bed 108. Monitoring module 302 monitors the re-communicated messages. Thereafter, monitoring module 302 identifies a message to which a probability has been assigned among the re-communicated messages and communicates the identification to selection module 304.

Subsequently, selection module 304 checks the probability value assigned to the message and based on the probability, selects the message for testing. Further, selection module selects a testing parameter based on the probability values assigned to the testing parameters. Thus, for example, if a message $X_1$ to which a probability of 0.9 has been assigned is identified by monitoring module 302, selection module 304 may select the message $X_1$ and further select a testing parameter $C_1$ having a probability of 0.8, thereby forming a combination $\{X_1, C_1\}$. Thus, the message $X_1$ will now be tested for the testing parameter $C_1$. In accordance with an embodiment, the tester may assign conditional probabilities to one or messages and one or more testing parameters. Further, selection module 304 configures the testing parameters based on the values received from the tester and communicates the configured testing parameters to network control module 306. Thereafter, network control module 306 emulates one or more wireless network conditions based on the configured testing parameters. It may be apparent to one skilled in the art that, configuration of the testing parameters involve packet rescheduling, packet dropping, and so forth. Further, the emulated wireless network conditions are communicated to wireless communication device 102 through connector 302. It will be apparent to one skilled in the art that connector 302 transmits the emulated wireless network conditions through a transmitter or a transceiver (not shown in the figure) embedded in test-bed 108. Furthermore, control module 206 interacts with connector 302 through hardware drivers.

The tester then observes the behavior of application 110, wherein application 110 may hang, or tries to reconnect with server 104, or requests for a new IP address, and so forth in the emulated wireless network conditions. Such observations made by the tester facilitate testing of application 110.

In yet another embodiment of the invention, the testing conditions mentioned above can also be achieved by using two test-beds. The two test-beds interact with each other and emulate wireless network conditions, based on the testing parameters provided by the test-beds.

Figure 4:
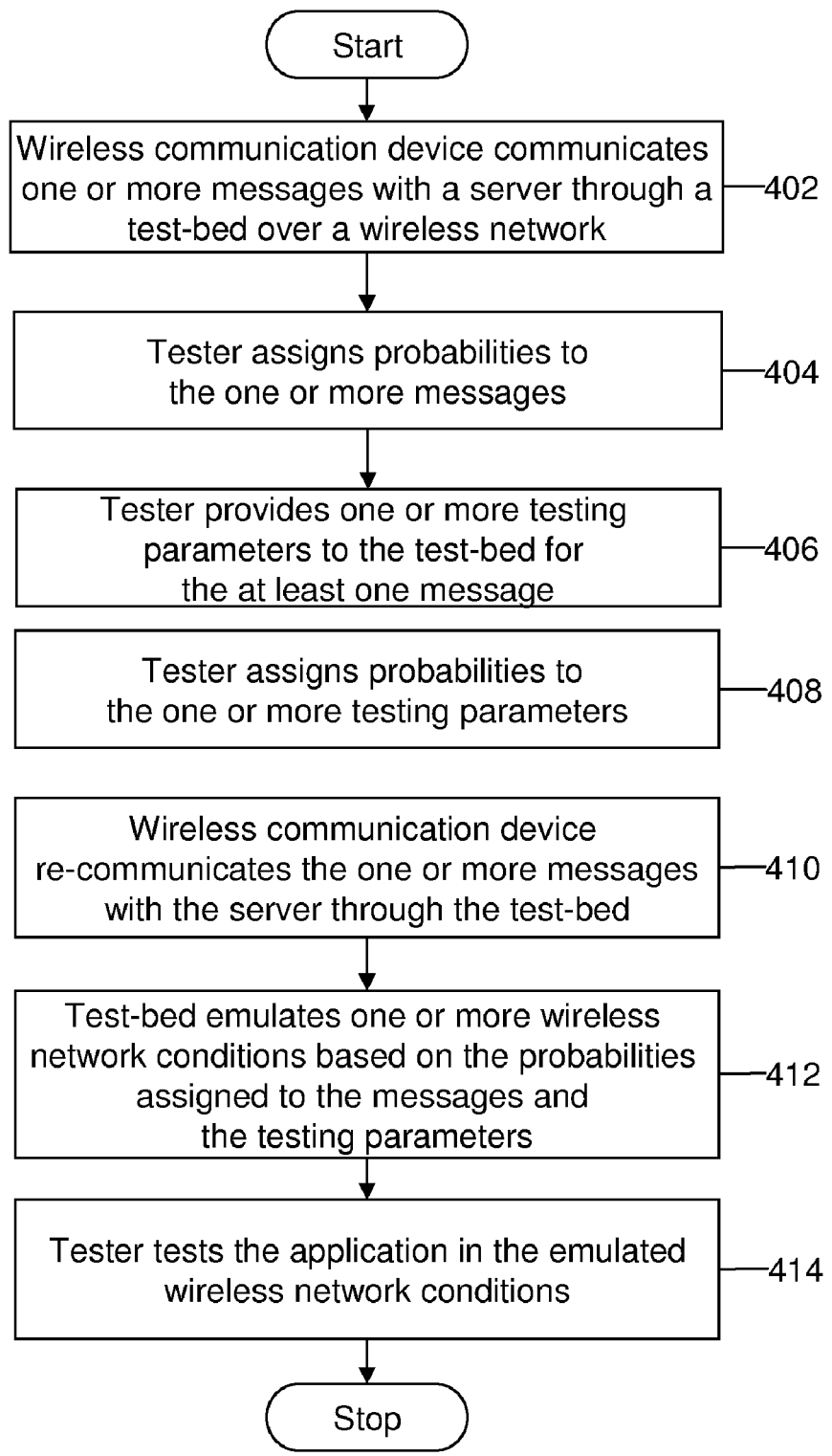
FIG. 4 is a flowchart of a method for testing application 110 installed on wireless communication device 102, in accordance with an embodiment of the invention.

FIG. 4 is a flowchart of a method for testing application 110 installed on wireless communication device 102, in accordance with an embodiment of the invention.

In accordance with various embodiments of the invention, a wireless communication device, such as wireless communication device 102, communicates with a server such as server 104 over a wireless network such as wireless network 106 through a test-bed such as test-bed 108. The wireless network is established by the test-bed. Further, the test-bed is connected with the server. In an embodiment of the invention, the connection between the server and the test-bed is a wired connection. In an embodiment of the invention, a tester can select the wireless network through the test-bed.

After the wireless network is established between the wireless communication device and the test-bed, the application, such as application 110, installed on the wireless communication device communicates one or more messages to the server at step 402. The messages are communicated to the server through the test-bed. For example, if the application such as an Internet browser is communicating with the server such as a bank server in a wireless network, then actions selected by a tester such as 'login details', 'transact' will correspond to respective messages such as 'login details message', 'transact message'. In various embodiments of the invention, the wireless communication device exchanges various messages with the server for communication, such as messages corresponding to initial connection, acknowledgment, and so forth. It may be apparent to one skilled in the art that the messages are constantly monitored by the test-bed.

Thereafter at step 404, the test-bed enables the tester to assign a probability to at least one message of the various messages that are communicated through the test-bed. In accordance with an embodiment, the tester assigns a probability to each of the one or more messages. The probability may be conditional or unconditional. Further, the tester also groups the one or more messages. At step 406, the tester assigns a probability to at least one testing parameter provided by the test-bed. In accordance with an embodiment, the tester assigns a probability to each of the one or more testing parameters. The probability may be conditional or unconditional. Further, the testing parameters correspond to the type of wireless network established between the wireless communication device and the test-bed. Testing parameters have been explained in detail in conjunction with FIG. 3.

After the tester has assigned probabilities to the one or more messages and the one or more testing parameters, the messages are re-communicated to the server by the application installed on the wireless communication device, at step 408. It may be apparent to one skilled in the art that the tester performs same actions as in step 402 in order to exchange the same messages. Further, in accordance with an embodiment, the tester specifies a terminating condition for re-communication of messages between the server and the wireless communication device. For example, the tester may specify a terminating condition in the form of a duration that the messages are to be re-communicated for one hour.

Thereafter, the test-bed monitors the messages that are re-communicated to the server. The test-bed emulates one or more wireless network conditions at step 410 when the one or more messages are identified by the test-bed, based on the probabilities assigned to the one or more messages and the one or more testing parameters. For example, if one of the messages to which a probability has been assigned is a 'transact message', the test-bed identifies the 'transact message' and selects it for testing based on the probability assigned to the 'transact message'. Further, the test-bed selects a testing parameter, for example, 'weak signal strength', based on the probability assigned to the one or more testing parameters. Further, the test-bed emulates weak signal strength, when 'transact message' is selected.

Subsequently, at step 412, the tester tests the application behavior at 'transact message' in the emulated weak wireless network conditions. For example, the tester tests the behavior of the application in weak signal strength when the 'transact message' is communicated to the server. The tester may note that, the application might hang or might try to reconnect with the server. Observing such behavior of the application in the emulated wireless network conditions facilitates the testing of the application.

In another embodiment of the invention, the application can be tested for more than one testing parameters simultaneously for a single message by the test-bed.

The method and test-bed mentioned above have a number of advantages. The method enables the tester to select messages for which an application can be tested. Further, the method enables the tester to test the application for specific wireless network conditions such as, loss of connectivity, by assigning a high probability to such a message from the one or more messages that are communicated between the application installed on the wireless communication device and the server. Thereby, the loss of connectivity can be emulated in order to check the behavior of the application at the selected message. By allowing the tester to group the messages, the method ensures that the number of combinations of the messages and the testing parameters is reduced, thereby enabling the user in reducing the number of test cases. Hence, the method enables the tester to select a finite set of messages and a finite set of testing parameters for which the application can be tested.

The method and test-bed for testing an application installed on a wireless communication device, as described in the present invention or any of its components, may be embodied in the form of a computer system. Typical examples of a computer system includes a general-purpose computer, a programmed microprocessor, a micro-controller, a peripheral integrated circuit element, and other devices or arrangements of devices that are capable of implementing the steps that constitute the method of the present invention.

The computer system comprises a computer, an input device, a display unit and the Internet. The computer further comprises a microprocessor. The microprocessor is connected to a communication bus. The computer also includes a memory. The memory may include Random Access Memory (RAM) and Read Only Memory (ROM). The computer system further comprises a storage device. The storage device can be a hard disk drive or a removable storage drive such as a floppy disk drive, optical disk drive, etc. The storage device can also be other similar means for loading computer programs or other instructions into the computer system. The computer system also includes a communication unit. The communication unit allows the computer to connect to other databases and the Internet through an I/O interface. The communication unit allows the transfer as well as reception of data from other databases. The communication unit may include a modem, an Ethernet card, or any similar device which enables the computer system to connect to databases and networks such as LAN, MAN, WAN and the Internet. The computer system facilitates inputs from a user through input device, accessible to the system through I/O interface.

The computer system executes a set of instructions that are stored in one or more storage elements, in order to process input data. The storage elements may also hold data or other information as desired. The storage element may be in the form of an information source or a physical memory element present in the processing machine.

The set of instructions may include various commands that instruct the processing machine to perform specific tasks such as the steps that constitute the method of the present invention. The set of instructions may be in the form of a software program. Further, the software may be in the form of a collection of separate programs, a program module with a larger program or a portion of a program module, as in the present invention. The software may also include modular programming in the form of object-oriented programming. The processing of input data by the processing machine may be in response to user commands, results of previous processing or a request made by another processing machine.

While the preferred embodiments of the invention have been illustrated and described, it will be clear that the invention is not limited to these embodiments only. Numerous modifications, changes, variations, substitutions and equivalents will be apparent to those skilled in the art without departing from the spirit and scope of the invention as described in the claims.

What is claimed is:

1. A method for testing an application installed on a wireless communication device, the wireless communication device communicating one or more messages to a server through a test-bed over a wireless network, the wireless network being established by the test-bed, the test-bed being connected to the server, the test-bed providing one or more testing parameters for the one or more messages, the method comprising:
   a. assigning a probability to at least one of the one or more messages, the probability being assigned by a tester, wherein the probability assigned to a message determines a likelihood of the message being selected for testing by the test-bed;
   b. assigning a probability to at least one of the one or more testing parameters, the probability being assigned by the tester, wherein the probability assigned to a testing parameter determines a likelihood of the testing parameter being selected by the test-bed for testing messages;
   c. re-communicating the one or more messages to the server through the test-bed, the one or more messages being re-communicated by the wireless communication device;
   d. emulating one or more wireless network conditions on identification of the one or more messages by the test-bed, wherein the one or more wireless network conditions are emulated by the test-bed based on the probabilities assigned to at least one of the one or more messages and at least one of the one or more testing parameters; and
   e. testing the application in the emulated wireless network conditions, the testing being performed by the tester.

2. The method according to claim 1, further comprising providing one or more values corresponding to each of the one or more testing parameters, the one or more values being provided by the tester.

3. The method according to claim 2, further comprising configuring the one or more testing parameters based on the one or more values.

4. The method according to claim 1, further comprising grouping the one or more messages into one or more groups, the one or more groups being specified by the tester.

5. The method according to claim 4, wherein the one or more wireless network conditions are emulated by the test-bed for each of the one or more groups independently.

6. The method according to claim 1, wherein the step of emulating the one or more network conditions comprises, on identification of the one or more messages by the test-bed, selecting the one or more testing parameters to form at least one combination of the one or more messages and the one or more testing parameters.

7. The method according to claim 6, wherein the one or more testing parameters are selected based on the probabilities assigned to the one or more testing parameters.

8. The method according to claim 6, wherein at least one of the one or more testing parameters is selected for each of the identified one or more messages.

9. The method according to claim 6, wherein the step of emulating the one or more network conditions further comprises determining whether a current combination of the one or more messages and the one or more testing parameters has been selected earlier for testing.

10. The method according to claim 9, further comprising selecting another combination of the one or more messages and the one or more testing parameters without testing the current combination if the current combination has been selected earlier for testing.

11. The method according to claim 6, wherein the one or more messages are identified based on at least one of size, content and sequence number of the one or more messages.

12. The method according to claim 1, wherein the probability assigned to at least one of the one or more messages is conditional probability.

13. The method according to claim 1, wherein the probability assigned to at least one of the one or more testing parameters is conditional probability.

14. A test-bed for testing an application installed on a wireless communication device, the wireless communication device communicating one or more messages to a server through the test-bed over a wireless network, the test-bed being connected to the server, the test-bed providing one or more testing parameters for the one or more messages, the test-bed comprising:

a. a user interface configured for:
  i. receiving a probability assigned to at least one of the one or more messages, the probability being assigned by a tester, wherein probability assigned to a message determines likelihood of the message being selected for testing by the test-bed; and
  ii. receiving a probability assigned to at least one of the one or more testing parameters, the probability being assigned by the tester, wherein probability assigned to a testing parameter determines likelihood of the testing parameter being selected by the test-bed for testing messages;
b. a memory module configured for storing the probabilities for the one or more messages and the one or more testing parameters;
c. a control module configured for emulating one or more wireless network conditions based on the probabilities assigned to at least one of the one or more messages and at least one of the one or more testing parameters, the one or more wireless network conditions being emulated on the identification of the one or more messages by the control module while the one or more messages are re-communicated from the wireless communication device to the server; and
d. a processor.

15. The test-bed according to claim 14, wherein the user-interface is further configured for receiving a grouping of the one or more messages from the tester.

16. The test-bed according to claim 14, wherein the user interface is further configured for receiving one or more values corresponding to each of the one or more testing parameters.

17. The test-bed according to claim 14, wherein the control module comprises a monitoring module configured for monitoring the one or more messages.

18. The test-bed according to claim 17, wherein the monitoring module is further configured for identifying the one or more messages based on at least one of size, content and sequence number of the one or more messages.

19. The test-bed according to claim 14, wherein the control module comprises a selection module, the selection module configured for selecting the one or more testing parameters on identification of the one or more messages, based on the probabilities assigned to at least one of the one or more messages and the one or more testing parameters.

20. The test-bed according to claim 14, wherein the control module further comprises a network control module, the network control module configured for emulating the one or more wireless network conditions based on the probabilities assigned to at least one of the one or more messages and the one or more testing parameters.

21. The test-bed according to claim 14, further comprising at least one connector configured for establishing a wireless network between the test-bed and the wireless communication device.

22. The test-bed according to claim 14, wherein the probability assigned to at least one of the one or more messages is conditional probability.

23. The test-bed according to claim 14, wherein the probability assigned to at least one of the one or more testing parameters is conditional probability.

24. A computer program product for use with a computer, the computer program product comprising a non-transitory computer usable medium having a computer readable program code embodied therein for testing performance of an application installed on a wireless communication device, the wireless communication device communicating one or more messages to a server through a test-bed over a wireless network, the wireless network being established by the test-bed, the test-bed being connected to the server, the test-bed providing one or more testing parameters for the one or more messages, the computer readable program code storing a set of instructions configured for:

a. receiving a probability assigned to at least one of the one or more messages, the probability being assigned by a tester, wherein probability assigned to a message determines likelihood of the message being selected for testing by the test-bed;
b. receiving a probability assigned to at least one of the one or more testing parameters, the probability being assigned by the tester, wherein probability assigned to a testing parameter determines likelihood of the testing parameter being selected by the test-bed for testing messages;
c. re-communicating the one or more messages to the server through the test-bed, the one or more messages being re-communicated by the wireless communication device;
d. emulating one or more wireless network conditions on the identification of the one or more messages at the test-bed, wherein the one or more wireless network conditions are emulated by the test-bed based on the probabilities assigned to at least one of the one or more messages and at least one of the one or more testing parameters; and
e. testing the application in the emulated wireless network conditions, the testing being performed by the tester.

25. The computer program code according to claim 24, further comprising the computer readable code for receiving one or more values corresponding to each of the one or more testing parameters, the one or more values being provided by the tester.

26. The computer program product according to claim 24, further comprising the computer readable code for configuring the one or more testing parameters based on the one or more values.

* * * * *